(12) United States Patent  
Ketonen

(10) Patent No.: US 9,215,846 B2
(45) Date of Patent: Dec. 22, 2015

(54) MULTI-PROCESS MACHINE

(76) Inventor: Lauri Ketonen, Kristiinankaupunki (FI)

( * ) Notice: Subject to any disclaimer, the term of this patent is extended or adjusted under 35 U.S.C. 154(b) by 1216 days.

(21) Appl. No.: 13/014,243

(22) Filed: Jan. 26, 2011

(65) Prior Publication Data

US 2011/0197997 A1 Aug. 18, 2011

(30) Foreign Application Priority Data

Feb. 17, 2010 (FI) .................................... 20105153

(51) Int. Cl.
A01G 23/083 (2006.01)
A01G 23/08 (2006.01)
A01G 23/095 (2006.01)

(52) U.S. Cl.
CPC .............. *A01G 23/083* (2013.01); *A01G 23/08* (2013.01); *A01G 23/095* (2013.01)

(58) Field of Classification Search
CPC ... A01G 23/08; A01G 23/081; A01G 23/091; A01G 23/093; A01G 23/095; A01G 23/097
USPC ........ 144/336, 338, 341, 335, 340, 343, 34.1, 144/24.13, 34.5, 34.6
See application file for complete search history.

(56) References Cited

U.S. PATENT DOCUMENTS

| 4,800,936 A | 1/1989 | Pomies et al. |
| 5,709,254 A | 1/1998 | Argue |
| 5,727,610 A | 3/1998 | Isley |
| 7,296,602 B1 | 11/2007 | Riha et al. |
| 7,320,349 B2* | 1/2008 | Gatz .............................. 144/335 |
| 2009/0025827 A1* | 1/2009 | Nokkala ................... B27L 7/00 144/4.1 |

FOREIGN PATENT DOCUMENTS

| FI | 78219 | 7/1989 |
| FI | 79927 | 4/1990 |
| FI | 82800 | 4/1991 |
| FI | 92454 | 11/1994 |
| JP | H01-503435 | 11/1989 |

* cited by examiner

*Primary Examiner* — Shelley Self
*Assistant Examiner* — Matthew G Katcoff
(74) *Attorney, Agent, or Firm* — Fildes & Outland, P.C.

(57) ABSTRACT

The invention relates to a multi-process machine for the felling and further processing of trees, which is arranged to be suspended on the boom of a loader device with the aid of a pivot. The suspension device of the multi-process machine includes a rotator attached to the arm of the suspension device as well as a transverse frame pivot in its lower part, for supporting the frame of the operating unit, and an operating device. The suspension device further includes a wide-angle mechanism between the operating device and the said frame, for enlarging the rotation created by the length of stroke of the operating device.

10 Claims, 6 Drawing Sheets

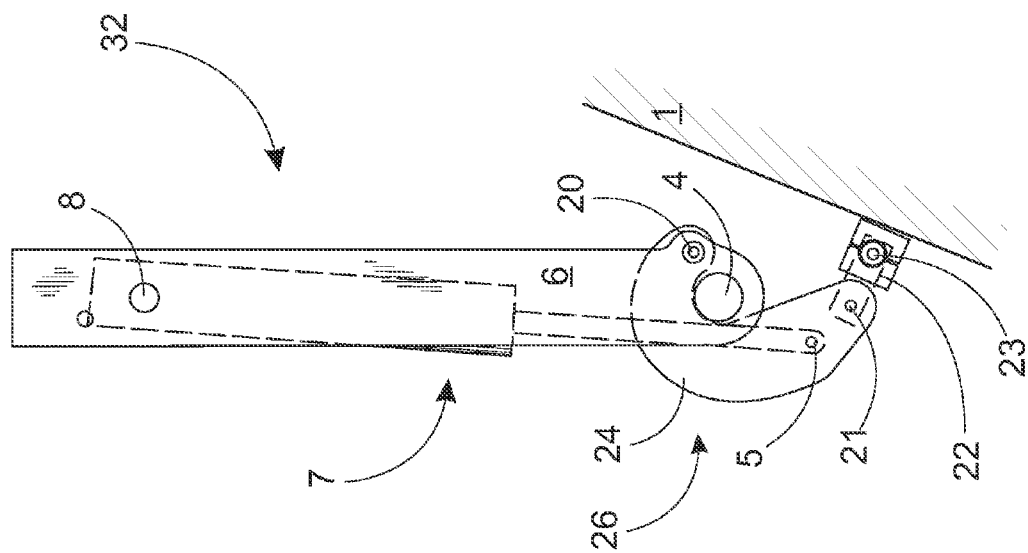
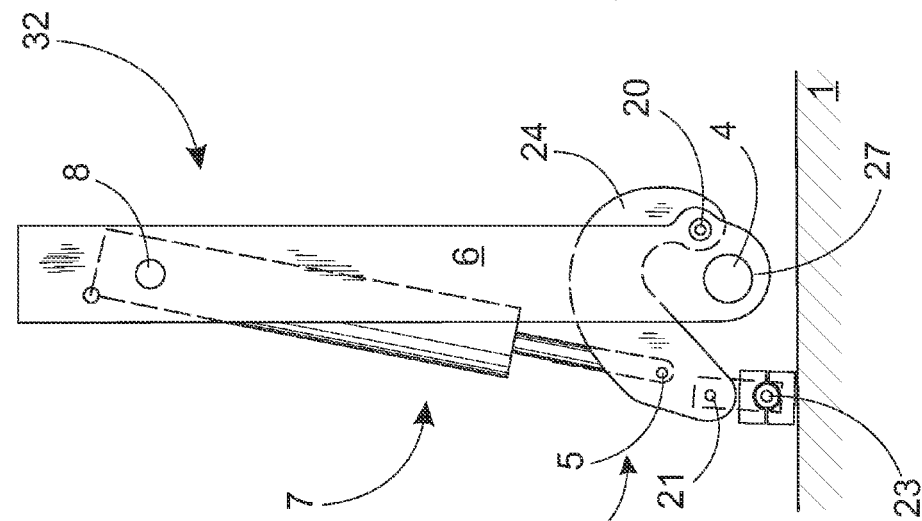
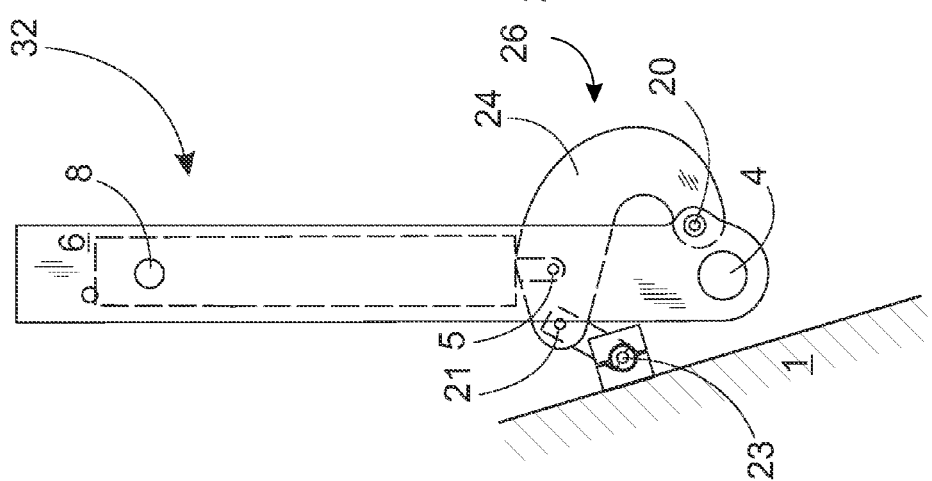

MULTI-PROCESS MACHINE

TECHNICAL FIELD

The present invention relates to a multi-process machine for the felling and further processing of trees, which is arranged to be suspended on the boom of a loader device with the aid of a pivot, the multi-process machine comprising a rotator for turning the multi-process machine, a suspension device, and an operating unit having a frame.

BACKGROUND OF THE INVENTION

The prior art is represented by a suspension device in a multi-process machine, according to Finnish patent FI 79927. The device works well in normal forest conditions. However, felling is increasingly moving to mountainous conditions. In such conditions, a multi-process machine should be able to operate as a machine capable of both felling and processing trees that have already been felled on a slope.

Particularly the processing of trees felled on lower slopes requires the suspension device to have a good ability to operate in the posterior position, in which the suspension device is in a position opposite to the felling position. For the suspension device to operate satisfactory, the suspension device must rotate through 160°, in difficult conditions even through 180°.

In multi-process machines according to the prior art, an insufficient length of stroke of the operating device and, on the other hand, a lack of available space, are problems that limit the rotation of the operating device of the multi-process machine. In addition, from the point of view of the operation of the multi-process machine, the dead centre of the operating device occurs in a disadvantageous point in the path of the multi-process machine, which is detrimental to the operation of the multi-process machine.

SUMMARY OF THE INVENTION

The invention is intended to create a multi-process machine for felling and further processing trees, which can be used on a sloping surface.

This intention can be achieved by using a wide-angle mechanism in the suspension device, between the operating device and the frame of the operating unit, in order to increase the rotation created by the length of stroke of the operating device. The wide-angle mechanism includes an intermediate arm and an auxiliary arm pivoted in series between the frame of the operating unit and the arm of the suspension device, in such a way that the intermediate arm is pivoted to the arm of the suspension device and the auxiliary arm is pivoted to the frame of the operating unit, while the operating device operates the intermediate arm. With the aid of the wide-angle mechanism, the operating unit is arranged to rotate through at least 160° around the pivot. This property allows the multi-process machine according to the invention to be used for felling on sloping surfaces, for example in mountainous conditions.

A cylinder with a small diameter can be used with the wide-angle mechanism of the multi-process machine according to the invention, which will provide degrees of freedom in terms of the design of the rest of the construction.

There is a first pivot between the intermediate arm and the arm of the suspension device, a second pivot between the intermediate arm and the operating device, a third pivot between the auxiliary arm and the intermediate arm, and a fourth pivot between the auxiliary arm and the frame of the operating unit.

The intermediate arm has a curved shape and is arranged, in its extreme position, to curve around the pivot.

According to one embodiment, the operating device is a hydraulic cylinder.

In the multi-process machine according to the invention, a dead point relative to the moment does not necessarily appear, so that the operations of the multi-process machine can always be controlled with the aid of the operating device.

BRIEF DESCRIPTION OF THE DRAWINGS

In the following, the invention is described in detail with reference to the accompanying drawings showing some applications of the invention, in which FIGS. 6a-6c show a cross-sectional side view of the suspension device of the multi-process machine according to the invention, when the operating unit is in different positions.

DETAILED DESCRIPTION OF THE PREFERRED EMBODIMENTS

Figure 1:
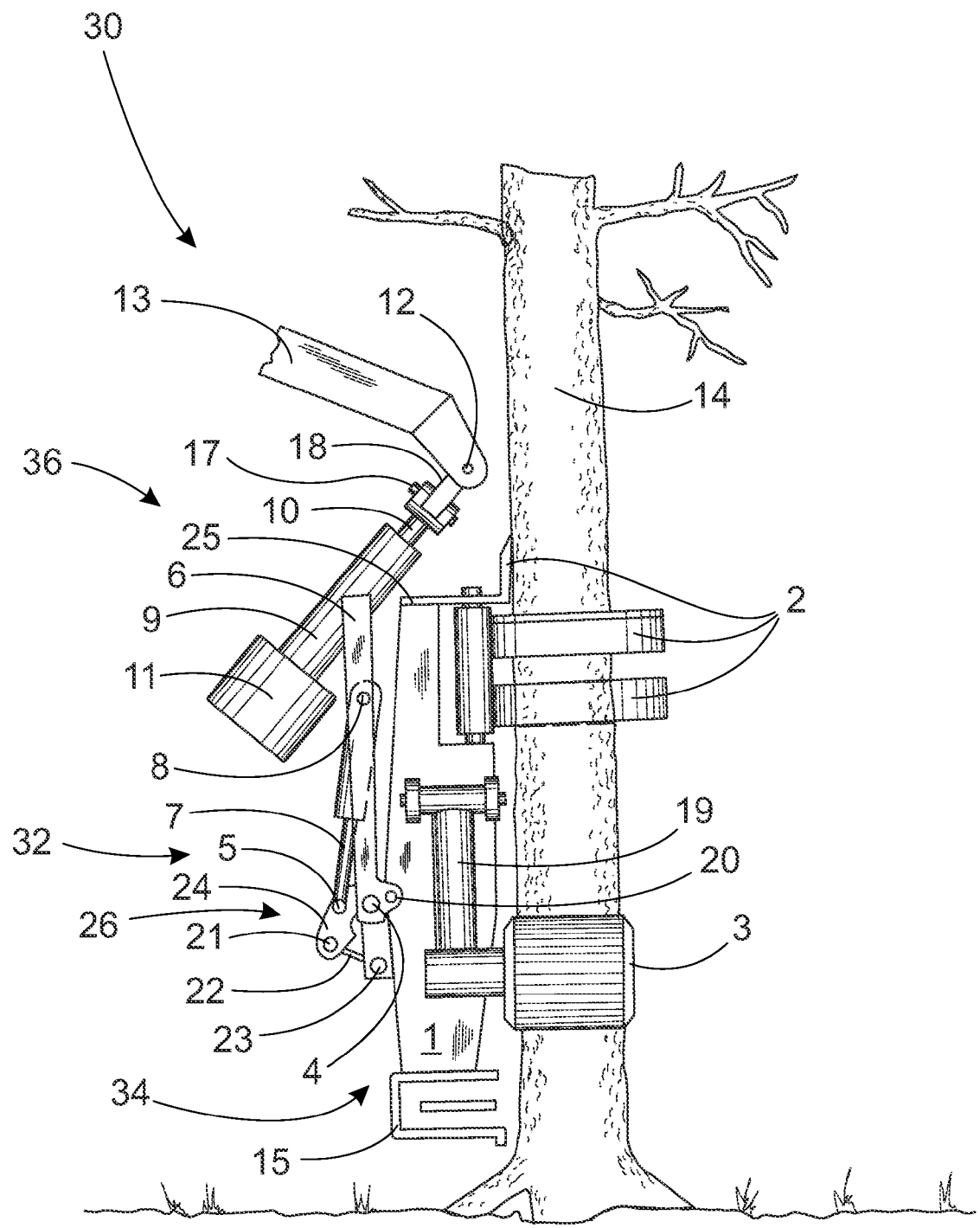
FIG. 1 shows one embodiment of the multi-process machine according to the invention, when it is in the felling position.
Figure 2:
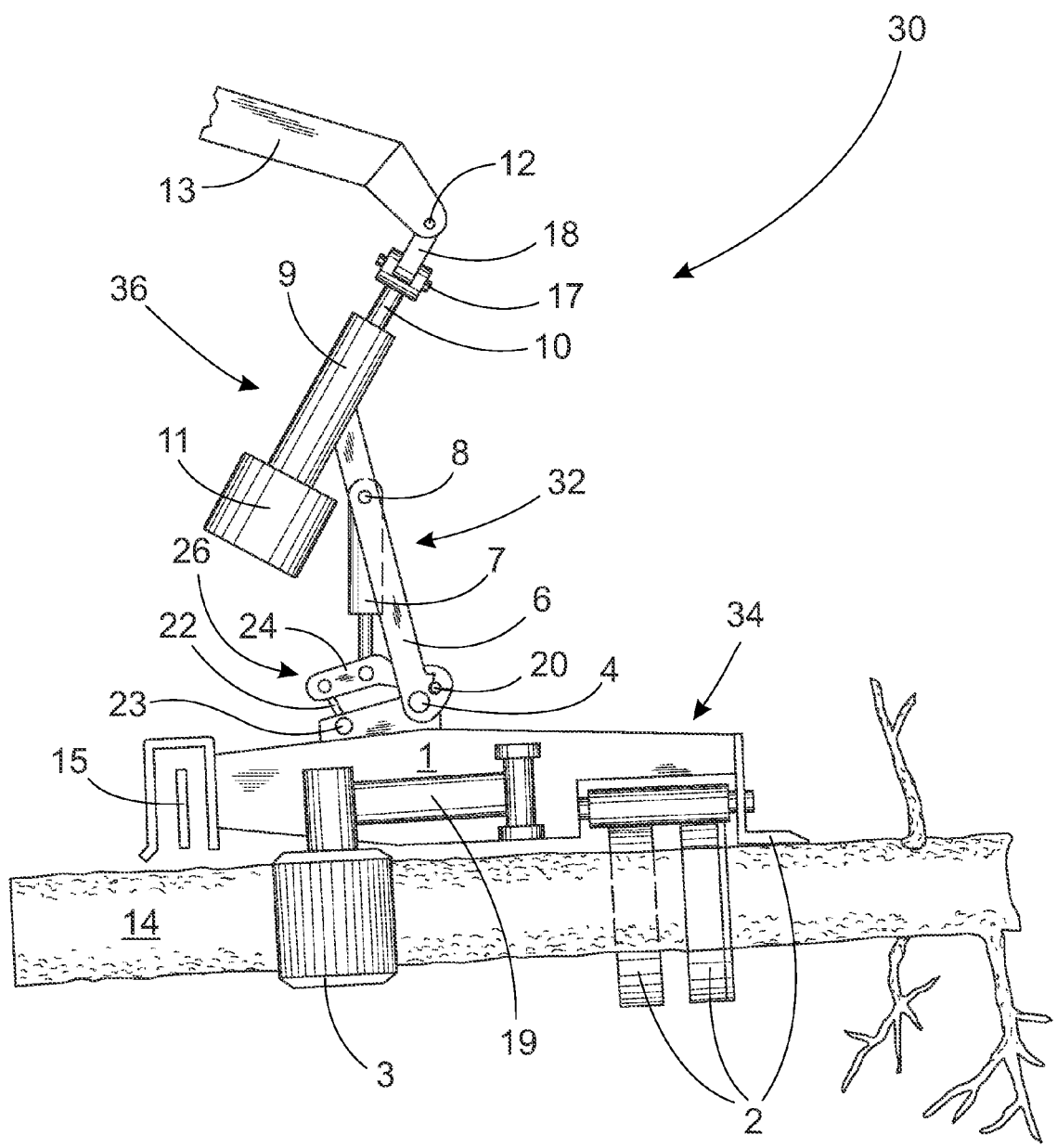
FIG. 2 shows one embodiment of the multi-process machine according to the invention, when it is in the stripping position.
Figure 3:
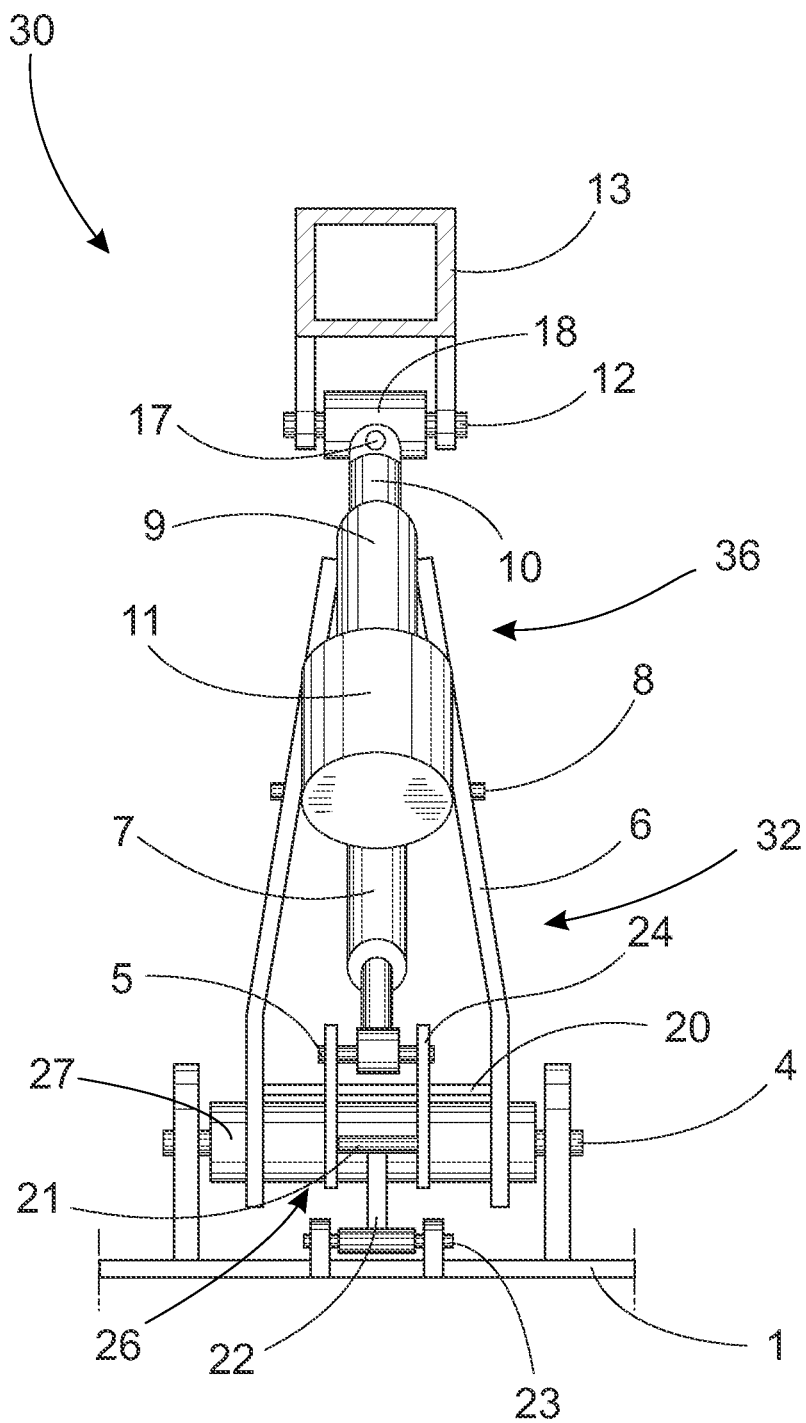
FIG. 3 shows a rear view of one embodiment of the multi-process machine according to the invention.

FIGS. 1-3 show one embodiment of the multi-process machine according to the invention. In FIG. 1, the suspension device 32 and operating unit 34 of the multi-process machine 30 are in the felling position. The multi-process machine 30 includes its rotating apparatus 36, suspension device 32, and operating unit 34. The multi-process machine 30 is suspended on a boom 13 at the pivot point 12. The boom can be a particular part of the hoist of a harvester, the boom of an excavator, or the boom of some corresponding mobile base. The multi-process machine 30 grips the tree 14 by means of the operating unit's 34 blades 2 and feed device 3. The feed device can be, for example, rollers, crawler tracks, or even a pulsed feed.

The other end of the suspension device 32 is attached by a frame pivot 4 to the frame 1 of the operating unit 34, with the aid of an arm 6, while the arm 6 of the suspension device 32 rotates around the frame pivot 4 through about 160°-180°. The extent of the rotation is permitted by a wide-angle mechanism 26 belonging to the suspension device 32, with the aid of which the rotation of the operating unit 34, caused by the length of stroke of the operating device, is enlarged. The arm 6 of the suspension device 32 is attached to the boom 13 with the aid of the frame 9 of the suspension device and the pivots 12, 17, 18. The shaft 10 and rotation motor 11 belonging to the rotation apparatus 36 can also be replaced with a separate rotation motor (rotator), in which case the rotation motor will be located above point 25. Point 25 is located at the front part of the frame 1 of the operating unit 34 of the multi-process machine 30 and is generally a critical point in the multi-process machine 30, in terms of the suspension device 32. The frame of the suspension device can also be a plate-like flange, or can be made from two parts (by splitting).

In order to rotate the operating unit 34, the multi-process machine 30 includes an operating device 7, which is attached to the arm 6 of the suspension device 32 with the aid of a pivot 8 and at the other end with the aid of a first pivot 5 on the intermediate arm 24 belonging to the wide-angle mechanism 26. A small space remains between the operating device 7 and the upper part of the arm 6, giving the operating device space to rotate slightly relative to the pivot 8. The operating device is preferably a hydraulic cylinder, but it can also be some other operating device suitable for the purpose. Hereinafter the operating device 7 will be referred as the cylinder 7.

The wide-angle mechanism 26 is intended to enlarge the rotation of the operating unit 34 created by the length of stroke of the cylinder 7. Thanks to it, a cylinder with a small diameter can be used as the operating device, which will provide degrees of freedom in the design of the rest of the construction. The intermediate arm 24 of the wide-angle mechanism 26 is attached to the arm 6 by means of a second pivot 20 and at the other end to the frame 1 with the aid of the auxiliary arm 22. The auxiliary arm 22 is attached by a third pivot 21 to the intermediate arm 24 and by a fourth pivot 23 to the frame 1 of the operating unit 34. The fourth pivot 23 can be attached to the frame 1 of the operating unit 34 with the aid of two parts belonging to the frame 1, between which the fourth pivot 23 is placed.

The felling saw 15 (saw device) of the multi-process machine 30 is located in the rear part of the multi-process machine 30 and the centre of gravity of the multi-process machine 30 is estimated as being at the point 19.

In FIG. 2, the multi-process machine 30 according to the embodiment of FIG. 1 is in the stripping position, where most work takes place. The mass and direction of the tree 14 determine the attitude of the multi-process machine 30, as the suspension of the multi-process machine 30 to the boom 13 of the loader device does not transmit a moment. The multi-process machine 30 hangs freely and adopts an attitude according to the overall centre of gravity. The attitude can be sloping up or sloping down or horizontal. Though the attitude can be adjusted over a wide range using the suspension device 32, the positions of the centre of gravity 19 and of the pivots 4 and 12 are important when the multi-process machine 30 is suspended without a tree. When seeking to make the operating unit 34 hang horizontally, the pivots 4 and 12 and the centre of gravity 19 will be on the same vertical straight line.

FIG. 3 shows a rear view of the suspension device 32 of the multi-process machine 30 according to the embodiment of FIG. 1. The arm 6 of the suspension device 32 is preferably formed of two plate-like beams. At the lower end, the arm 6 is connected by tube 27 around the frame pivot 4. The cylinder 7 lies between the arm 6, as does the intermediate arm 24. The intermediate arm 24 and the auxiliary arm 22, together with their pivots, form the wide-angle mechanism 26. The length of the pins of the first pivot 5 and the third pivot 21 is less than the distance inside the arms 6, so that the arms 6 can rotate past the pivots 5 and 21.

Figure 4:
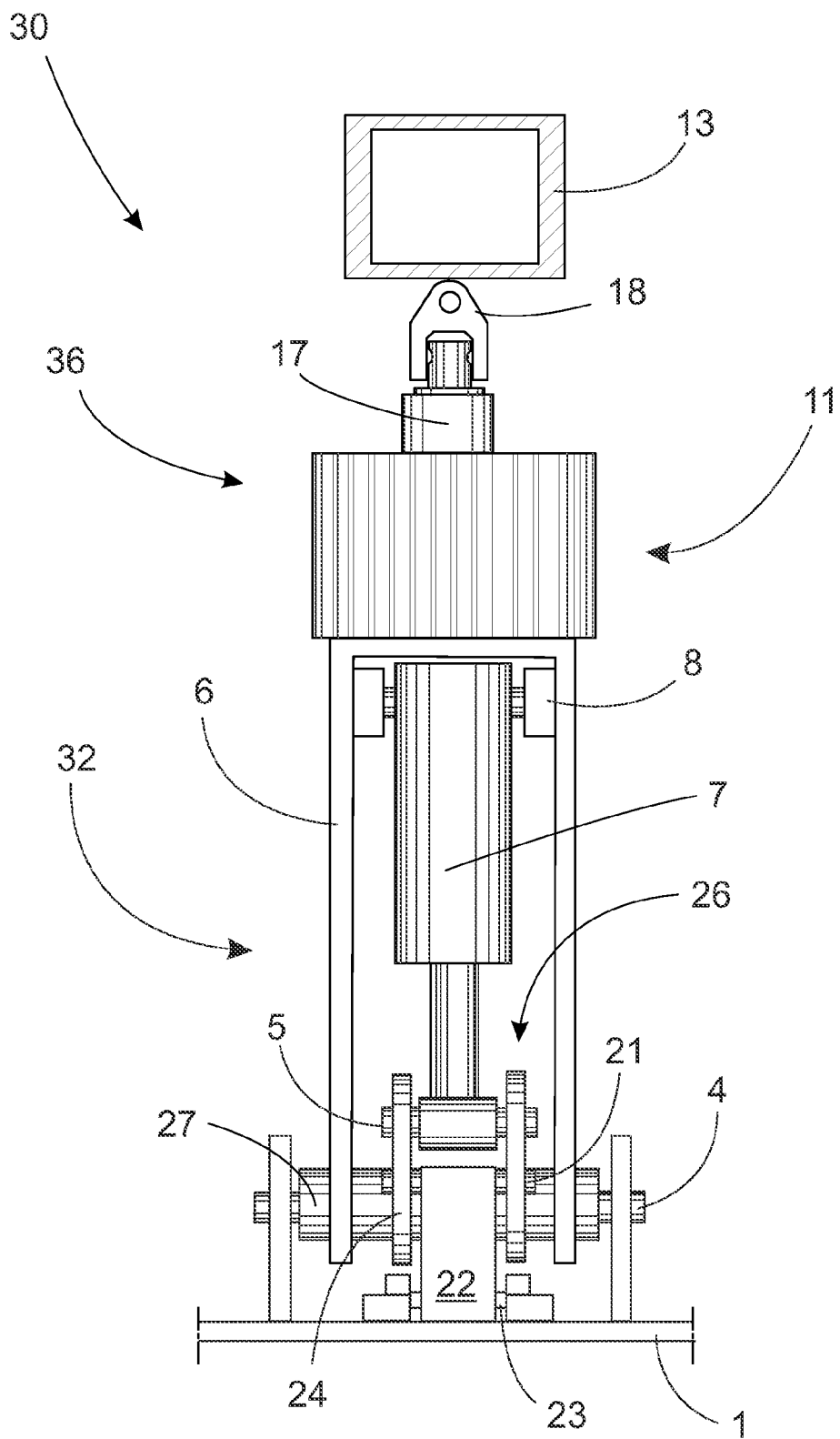
FIG. 4 shows a rear view of a second embodiment of the multi-process machine according to the invention.

FIGS. 4-6c show a second embodiment of the multi-process machine 30. FIG. 4 shows a rear view of the suspension device 32 of the multi-process machine 30 according to the embodiment. In this embodiment, the arms 6 of the suspension device 32 are straight, unlike in FIG. 3. In addition, the rotator 11 is located directly above the arms 6 of the suspension device 32, from which the multi-process machine 30 can be attached to the boom 13.

Figure 5:
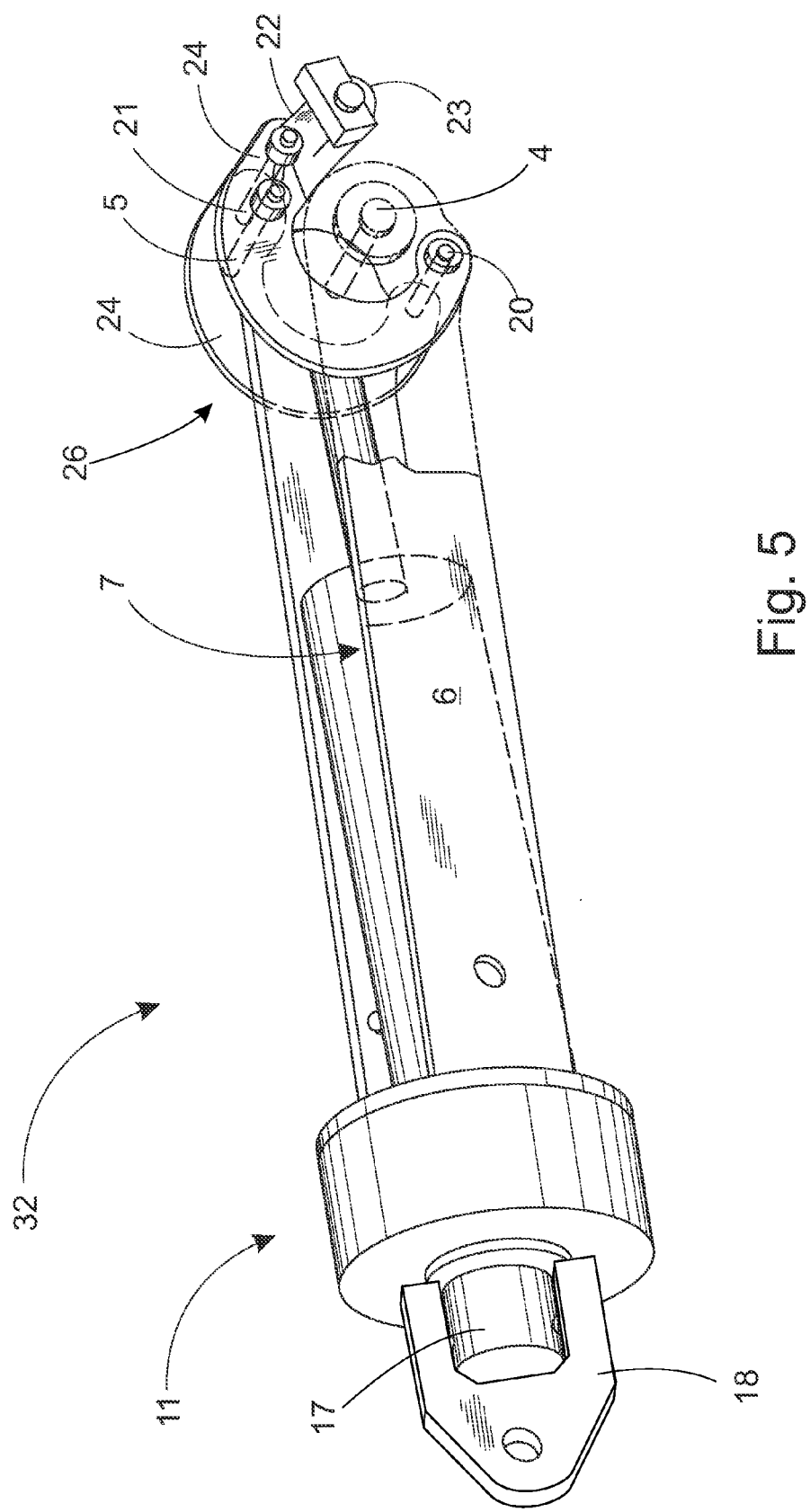
FIG. 5 shows a partly cross-sectioned axonometric view of the construction of the suspension device of the multi-process machine according to the invention.

FIG. 5 shows a partial cross-section of the construction of the suspension device 32 of the multi-process machine 30 according to the invention. The movement of the cylinder 7 is transmitted through the first pivot 5 of the wide-angle mechanism 26, which moves the intermediate arms 24. The intermediate arms 24 turn relative to the pivot 20 and rotate around the frame pivot 4, so that the intermediate arms 24 push the auxiliary arm 22 by means of the third pivot 21. For its part, the auxiliary arm 22 is pivoted to the frame of the operating unit (not in the figure), with the aid of the fourth pivot 23. When the wide-angle mechanism 26 moves, the frame of the operating unit rotates relative to the frame pivot 4.

According to FIGS. 6a-6c, the second pivot 20 is located close to the frame pivot 4. Further, if the arm 6 of the suspension device 32 is approximately at the 11 o'clock position relative to the frame pivot 4, the second pivot 20 will be approximately between 1 o'clock and 3 o'clock. The distance between the pivots 20 and 21 is greater than the distance between the pivots 4 and 20. Further, the distance between the pivots 21 and 20 is greater than the distance between the pivots 21 and 23. The distance between the pivots 5 and 20 is greater than the distance between the pins of 5 and 21.

The intermediate arm 24 can be shaped in such a way that, particularly in the felling position, it can clear the tube 27 connecting the lower part of the arms (shafts) 6. In other words, the intermediate arm 24 is curved and arranged, in its extreme position, to curve around its pivot. The shaping of the intermediate arm 24 depends to a considerable extent on the diameter of the tube 27, which connects the arms 6 of the suspension device 32 and is set around the frame pivot 4. The intermediate arm 24 can preferably be manufactured from two plates by giving them a curved shape.

In this connection, the term curving of the intermediate arm 24 refers to the fact that the shape of the intermediate arm 24, which partly conforms to the cross-sectional shape of the tube 27 around the frame pivot 4, settles in its extreme position close to the surface shape of the tube 27. The extreme position is the outmost position of the intermediate arm 24 when cylinder 7 is extended to the fullest and the frame 1 is tilted almost or entirely parallel with arm 6. The intermediate arm 24 is shaped to run around, in its extreme position according to the FIG. 6c, the tube 27 and the frame pivot 4. At no stage does the shape of the intermediate arm 24 change when the intermediate arm 24 moves.

The location of the frame pivot 4 is determined mainly on the basis of the centre of gravity 19, whereas the locations of the pivots 5, 20, 21, and 23 are determined on the basis of the desired properties. When the cylinder 7 of the multi-process machine 30 according to the invention lengthens, the suspension device 32 turns clockwise from the position according to FIGS. 1 and 2 while when the cylinder 7 shortens the suspension device 32 turns counterclockwise. This is due to the movement of the centre of gravity of the load being carried, when the load always seeks equilibrium. For its part, the operating unit 34 turns counterclockwise relative to the suspension device 32 when the cylinder 7 lengthens and clockwise when it shortens. Even though the angle of rotation were to be about 160°, i.e. in the position in FIG. 6a, the dead point of the cylinder would not be in between, instead the counterclockwise moment can approach zero in the extreme position. In other words even though the angle of rotation were to be close 0°, i.e. in the position shown in FIG. 6a, there would not be a dead point of the cylinder in between positions shown in FIGS. 6a and 6c. Instead the counterclockwise moment can approach zero in the extreme position shown in FIG. 6c.

The angle of rotation refers to the angle between the frame 1 in FIGS. 6a and 6c. In other words the angle of rotation refers to the angle of rotation of the frame 1 of the operating unit 34 in relation to the arm 6 of the suspension device 32 between FIGS. 6a and 6c. This is due to the counterclockwise rotation (FIG. 2) being only so-called settling movement. The moment in the felling position of FIG. 6c, on the other hand, should be sufficient to allow small trees to be lifted in a vertical attitude. The location of the first pivot 5 on the intermediate arm 24 is determined on the basis of the cylinder 7, the felling moment, and the desired moment in the extreme position shown in FIG. 6c. The larger the piston rod of the cylinder 7 and thus also the perpendicular distance at right angles to the first pivot 5 from the frame pivot 4, the greater the moment created by the movement of the cylinder 7.

The angle of rotation of 160° refers to FIG. 6c. FIG. 6b shows the position of the angle of rotation of about 80-90° and FIG. 6a shows the position of zero angle. FIG. 6c is the felling position whereas the position shown in FIG. 6a is the position used when operating in steep hills. Since the angle of rotation has been defined as the angle of rotation of the frame 1 between FIGS. 6a and 6c zero angle and angle of rotation of 160° can be understood also vice versa. Here the extreme position refers to the extreme position of the whole multi-process machine shown in FIG. 6c. Therefore it refers also to the outmost positions of all the moving members of the suspension device 32. The angle of rotation in the extreme position can be up to 180°.

The placing of the pivots and arms and the dimensions of the distances between them is of great importance to the properties of the multi-process machine according to the invention. The dimensioning of the pivots and arms and their mutual positioning are extremely important, because the space available for the wide-angle mechanism is small and the degrees of freedom few.

The invention claimed is:

1. Multi-process machine for the felling and further processing of trees, which is arranged to be suspended on the boom of a loader device with the aid of a pivot point, said machine comprising:
    a rotator for turning the multi-process machine about said pivot point, the multi-process machine being arranged to hang freely from said pivot point and to adopt an attitude according to overall center of gravity of said machine,
    a suspension device having two ends, one end attached to the boom with aid of said pivot point, and
    an operating unit having a frame connected to the suspension device for the felling and further processing of trees, a second end of the suspension device being attached to the frame by a frame pivot, and
    wherein the said suspension device further comprises,
    an arm attached to the said rotator, said arm having an upper and a lower part,
    an operating device having a first end and a second end, the operating device being pivotally connected at said first end to the arm in order to rotate the operating unit into the felling and stripping positions, and
    a wide-angle mechanism connected between the said second end of the operating device and the said frame, for supporting the said frame and for enlarging the angle of rotation of the operating unit frame created by the length of stroke of the operating device, and wherein the said wide-angle mechanism further comprises,
    an intermediate arm pivotally connected to the said arm and operated by the second end of the said operating device and
    an auxiliary arm pivotally connected between the said frame and the intermediate arm.

2. Multi-process machine according to claim 1, wherein between the said intermediate arm and the second end of the operating device is a first pivot and between the intermediate arm and the said arm is a second pivot.

3. Multi-process machine according to claim 1, wherein between the said auxiliary arm and the intermediate arm is a third pivot and between the auxiliary arm and the frame of the operating unit is a fourth pivot.

4. Multi-process machine according to claim 2, wherein between the said auxiliary arm and the intermediate arm is a third pivot and between the auxiliary arm and the frame of the operating unit is a fourth pivot.

5. Multi-process machine according to claim 1, wherein the said intermediate arm is curved in shape and is arranged to curve around the frame pivot when in its extreme position.

6. Multi-process machine according to claim 2, wherein the said intermediate arm is curved in shape and is arranged to curve around the frame pivot when in its extreme position.

7. Multi-process machine according to claim 3, wherein the said intermediate arm is curved in shape and is arranged to curve around the frame pivot when in its extreme position.

8. Multi-process machine according to claim 4, wherein the said intermediate arm is curved in shape and is arranged to curve around the frame pivot when in its extreme position.

9. Multi-process machine according to claim 1, wherein the said operating device is a hydraulic cylinder.

10. Multi-process machine according to claim 1, wherein, with the aid of the said wide-angle mechanism, the operating unit is arranged to rotate around the frame pivot through at least 160°.

* * * * *